(12) United States Patent
Graber

(10) Patent No.: US 6,948,749 B2
(45) Date of Patent: Sep. 27, 2005

(54) CROSS MEMBER FOR VEHICLE BUMPER BAR AND METHOD FOR MAKING SAME

(75) Inventor: Donald G. Graber, Garden City, MI (US)

(73) Assignee: Trim Trends Co., LLC, Farmington Hills, MI (US)

(*) Notice: Subject to any disclaimer, the term of this patent is extended or adjusted under 35 U.S.C. 154(b) by 0 days.

(21) Appl. No.: 10/894,826

(22) Filed: Jul. 20, 2004

(65) Prior Publication Data
US 2005/0162631 A1 Jul. 28, 2005

Related U.S. Application Data

(60) Provisional application No. 60/539,511, filed on Jan. 26, 2004.

(51) Int. Cl.⁷ .............................................. B60R 19/02
(52) U.S. Cl. ................................. 293/102; 276/187.03
(58) Field of Search ................................ 293/102, 130, 293/132, 133, 135, 146; 276/187.05, 187.09

(56) References Cited

U.S. PATENT DOCUMENTS

| | | | |
|---|---|---|---|
| 5,080,411 A | * | 1/1992 | Stewart et al. ............ 293/122 |
| 5,092,512 A | | 3/1992 | Sturrus et al. |
| 5,104,026 A | | 4/1992 | Sturrus et al. |
| 5,306,058 A | | 4/1994 | Sturrus et al. |
| 5,395,036 A | | 3/1995 | Sturrus |
| 5,454,504 A | | 10/1995 | Sturrus |
| 5,566,874 A | | 10/1996 | Sturrus |
| 5,813,594 A | | 9/1998 | Sturrus |
| 6,000,738 A | * | 12/1999 | Stewart et al. ............ 293/102 |
| 6,042,163 A | * | 3/2000 | Reiffer ...................... 293/155 |
| 6,141,935 A | * | 11/2000 | Artner et al. ............. 52/735.1 |
| 6,360,441 B1 | * | 3/2002 | Himsl et al. ............. 29/897.2 |
| 6,412,836 B1 | * | 7/2002 | Mansoor et al. .......... 293/132 |
| 6,467,831 B1 | * | 10/2002 | Mori et al. ................ 296/102 |
| 6,485,072 B1 | * | 11/2002 | Werner et al. ............ 293/132 |
| 6,540,276 B2 | * | 4/2003 | Azuchi et al. ............ 293/102 |
| 6,644,699 B2 | * | 11/2003 | Anderson et al. ......... 293/102 |
| 2001/0054827 A1 | * | 12/2001 | Sundgren et al. ......... 293/102 |
| 2002/0149214 A1 | * | 10/2002 | Evans ....................... 293/120 |
| 2002/0180222 A1 | * | 12/2002 | Janssen .................... 293/102 |
| 2003/0034657 A1 | * | 2/2003 | Garcia et al. ............. 293/102 |

* cited by examiner

Primary Examiner—H. Gutman
(74) Attorney, Agent, or Firm—Dykema Gossett PLLC

(57) ABSTRACT

A two step system or stage is provided to manufacturer a bumper of "B" shape cross section including a roll forming-welding stage where a straight cross member of a length to mount on the front or rear of various models of automobiles and the bending stage where any curvature or sweep is introduced into the cross member as required by the design of the automobile. The roll forming welding stage include the spot or tack welding of the front wall to the web followed immediately by welding together without any gaps therebetween the abutting longitudinal edges utilizing a high frequency welder. Thus, the "B" shaped cross section of the bumper may be used to make different bumpers of various lengths and curvatures.

2 Claims, 7 Drawing Sheets

CROSS MEMBER FOR VEHICLE BUMPER BAR AND METHOD FOR MAKING SAME

CROSS REFERENCE TO RELATED APPLICATION

This application claims the benefit of U.S. Provisional Patent Application Ser. No. 60/539,511 filed Jan. 26, 2004.

FIELD OF THE INVENTION

This invention relates to a roll formed tubular vehicle cross member, bumper beam or bar fabricated from high or ultra-high strength steel. The cross member may be either straight or provided with a sweep or curvature having a value of more than 10. The resulting tubular bumper has a high impact resistance, low weight and relatively low cost of manufacture.

BACKGROUND OF THE INVENTION

Bumper beams or cross members for vehicles, particularly automobiles, are made from high strength or ultra-high strength steel. It has been difficult to manufacture the bumper beam or bar out of some high strength steel because such bar requires a curvature to be placed therein. It is necessary to roll form the cross member to obtain the desired curvature. In the past, when high strength steel is roll formed into the desired sweep or curvature, the material of the cross members has been damaged during the process resulting in unacceptable quality. The high strength obtainable with such steels is desired in order to provide a bumper beam or bar which can be impacted at speeds of up to 5 mph without resulting damage.

It is desired for certain applications where high strength is needed to use higher carbon steels, frequently alloyed with other materials. Such steels are characterized as "high-strength steels". Within this category, there is a class defined as "ultra-high strength steel". Such steel has a minimum yield of 100 ksi (100,000 pounds per square inch). Chemical compositions for such steel vary from one producer to another. Different compositions and thermo-mechanical processing may produce equivalent results. Formability of high strength steel is difficult than with low carbon steels because of greater spring-back and reduced ductility.

Thus, industry requires that bumpers maintain a high level of strength and damage resistance to meet the expectations of the consumer and government regulations throughout the world concerning low speed vehicular impact. The bumper must be of low weight to minimize vehicle dead weight which reduces gas mileage and increases suspension requirements. Also, bumpers must have a low manufacturing cost and a high dimensional consistency. Thus, high strength-to-weight ratios and ease of manufacture are of importance to the automotive industry.

Various systems, methods and equipment have been employed to manufacture tubular roll-formed automotive bumpers or cross members such as disclosed in the Sturrus et al U.S. Pat. Nos. 5,306,058, 5,092,512 and 5,104,026, each relating to a tubular bumper beam, method and/or apparatus for roll forming an automotive bumper. The same equipment and methods employed in the foregoing patents have also been used to manufacture "B" section cross members as disclosed in the Sturrus' U.S. Pat. No. 5,395,036 entitled "Method of Roll Forming an End Automotive Bumper"; and U.S. Pat. Nos. 5,454,504, 5,566,874 and 5,813,594, entitled "Apparatus For Forming an End Bumper for Vehicles".

A disadvantage of the methods and apparatuses disclosed in the Sturrus and Sturrus et al patents is that the method and apparatus for forming the straight tubular "B" section cross member and the equipment for forming the sweep in the cross members are connected together in one line, with the severing of the cross member from the roll formed member being located down stream of the welding station. With such a process, the curvature or sweep is placed in the cross member prior to cutting the swept integral tube.

SUMMARY OF THE PRESENT INVENTION

A feature of the present invention is to provide a tubular cross member of "B" shape which is roll formed from a single sheet of high strength or ultra-high strength steel. With such a construction, two side-by-side longitudinally extending tubular sections are connected by a web, with each section having a front wall, a rear wall, an outer side wall and an inner side wall. The inner side walls are spaced one from the other and are connected together by the web roll formed integrally with the inner side walls. As the roll formed cross member leaves the last roll former, the front wall overlies the web and is spot or tact welded to the web at longitudinally spaced areas and thereafter the pair of abutting longitudinal edges are welded together by a high frequency welder.

Another further feature of the present invention is to provide an in-line system of standard metal forming and welding equipment to produce a straight tubular cross member which later on can be swept at a remote bending station to provide a bumper with a curvature. The in-line system includes a roll mill with a series of roll formers where the "B" shaped cross section of the cross member is provided, a spot welder and a high frequency welder followed by a cut-off machine. After the spot or tact welding has taken place, the steel strip continues to move and the abutting longitudinal edges are moved through the high frequency welder where the abutting longitudinal edges are welded together without any gaps therebetween. After the welding steps have been completed, the cut-off machine cuts the straight tubular cross member to a predetermined length.

Still another feature of the present invention is to provide a method and equipment of the aforementioned type wherein after the cross member has been severed by the cut-off machine, it is manually or automatically placed in a gravity stacking system that is palletized.

A further feature of the present invention is to provide a method for placing a curvature or sweep in a cross member of B shape cross section by moving the stacking system or pallet to a remote work station where a curvature or sweep is placed in each cross member independent of and separate from the in-line roll mill and equipment.

The present invention provides a vehicle bumper bar and method of making the bumper bar from high strength or ultra-high strength steel and roll formed into a tubular cross section of B shape. The cross member may be made from a variety of steels of varying thickness, cut to different lengths and bent to different curvatures for various automobiles. The equipment utilized in the system remain the same since the cross section remains the same for different length and different curvature bumpers. This system thus provides an economical advantage over the prior art methods and equipment discussed previously where the steel is fabricated in tubular form and swept in one apparatus since there will be no additional tooling costs for providing bumpers of various lengths.

With the present invention, the method and equipment employed may be used to make bumpers or cross members of different lengths and curvatures without changing the roll formers since the same cross section is utilized. Thus, a less costly tooling system is provided for making various bumpers for different manufacturers which is extremely important because of the competitiveness of the industry.

A final feature of the present invention is to provide a unique method of forming a straight tubular cross member by using a rolling spot or tact weld process to connect portions of the cross member to the web followed by the in-line high frequency butt welding process to join the longitudinal edges.

DESCRIPTION OF THE PREFERRED EMBODIMENT

Figure 1:
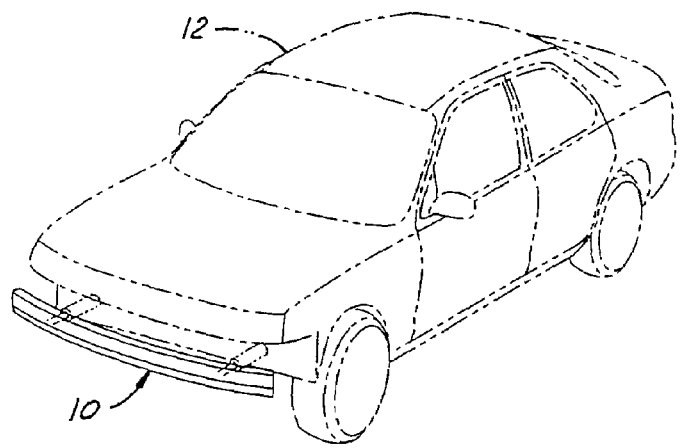
FIG. 1 is a perspective view of an automobile, in dotted lines, with a novel bumper beam made from a "B" section blank mounted on the front of the automobile.

The bumper 10 of the present invention is illustrated in FIG. 1 mounted on the front of an automobile 12 although it should be understood that the bumper, with or without a sweep, may be mounted either on the front or rear of the automobile 12.

Figure 2A:
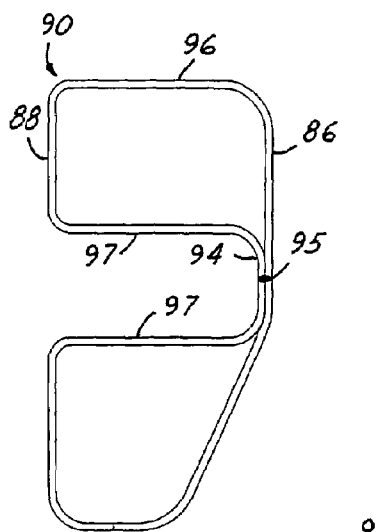
FIG. 2A is a "B" shape cross section taken on the line 2A—2A of FIG. 2
Figure 2B:
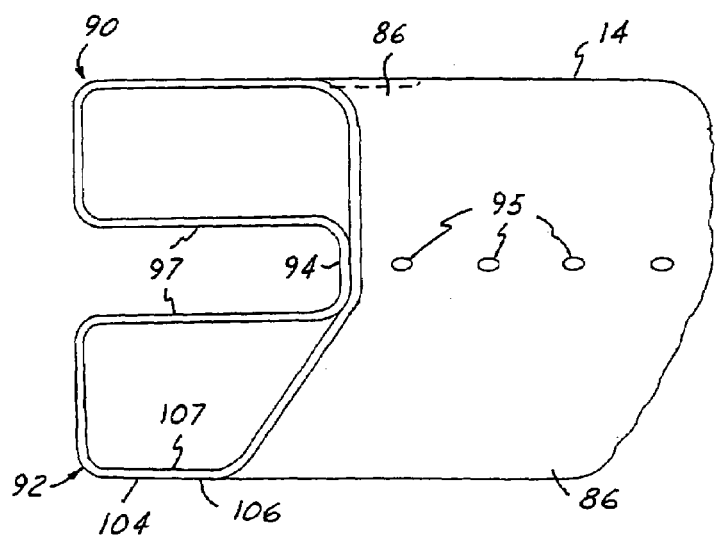
FIG. 2B is a fragmentary perspective view of one end of the cross member.
Figure 2:
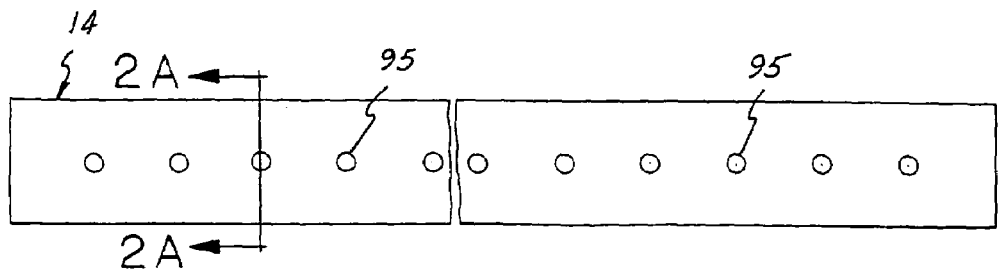
FIG. 2 is a top view of the tubular straight cross member, bumper or bumper beam.
Figure 3:
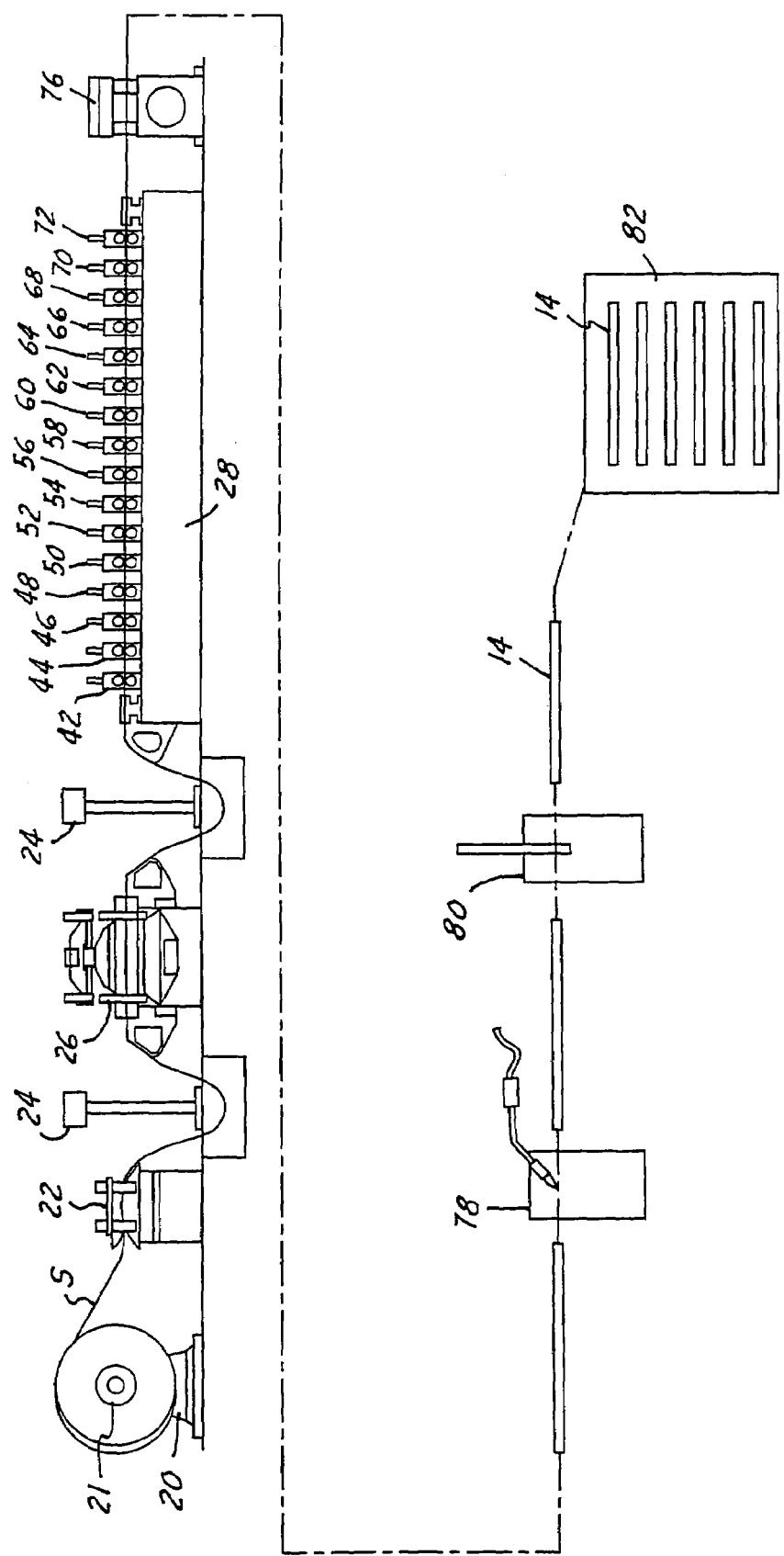
FIG. 3 is a schematic view of the roll-forming apparatus and related equipment for practicing the process of the present invention.

The bumper beam 10 is made in two manufacturing stages. The first manufacturing stage is illustrated in FIG. 3 where the method and apparatus is demonstrated and illustrated for making a straight tubular cross member 14 as illustrated in FIG. 2 with a B shaped cross section as shown in FIG. 2A. The equipment and method utilized for manufacturing the straight tubular cross member 14 includes an in-line system of standard metal forming and welding equipment including a steel roll holder 20 rotatably supporting a steel roll 21 of strip steel S; a straightener system or straightener 22 and a pair of guide posts 24 located on opposite sides of a punch press 26 for directing steel strip as it moves along the line. Downstream from the punch press 26 where mounting openings are placed is a roll mill 28 having a series of roll formers where the B shaped cross section of the straight cross member 14 is shaped. There are sixteen (16) roll formers identified by the even numerals 42–72 inclusive. Downstream of the roll former 72 is a tack or spot welder 76 followed immediately inline by a high frequency welder 78, where the longitudinal edges of the roll formed tubular section are welded together from one end to the other end. The cut off machine 80 is located downstream of the welder 78 and severs the cross member 14 at the requisite length.

Each straight tubular cross member 14 is a roll formed, single sheet of high or ultra-high strength steel having a pair of longitudinal edges which abut and are welded together. The B shaped cross member 14 of FIGS. 2A and 2B includes two side-by-side longitudinally extending tubular sections 90 and 92 which are connected together by a web 94, each section 90 and 92 having a front wall 86, a rear wall 88, outer side wall 96 and an inner side wall 97. Inner side walls 97 are spaced one from the other and are connected together by the web 94 roll-formed integrally with the inner side walls 97. As the roll formed cross member 14 leaves the last roll former 72, the front wall 86 which overlies the web 94 is spot welded to the web 94 at longitudinally spaced areas 95. The spot weld 95 may be placed, as an example, from eight to twelve inches apart along the length of the cross member 14. As the welded tubular structure continues to move along the line, the high frequency welder 78 butt welds the longitudinal edges 104 and 106 together from one end to the other. The abutting longitudinal edges 104 and 106 are welded together as represented by the weld line 107.

After the welding steps have been completed, the cut off machine 80 cuts the straight tubular cross member 14 to a predetermined length and thereafter the cross member 14 is placed either manually or automatically in a gravity stacking system 82 that is palletized. With such a construction and procedure, the B shaped cross member 14 which is severed by the cut off machine 80 is straight from one end to the other. The cross member 14 can be utilized as a straight bumper and mounted on an automobile in place of the curved bumper of FIG. 1. The palletizer or collection container 82 is spring loaded and the cross members 14 are automatically or manually stacked on the gravity stacking system or apparatus 82.

Figure 4:
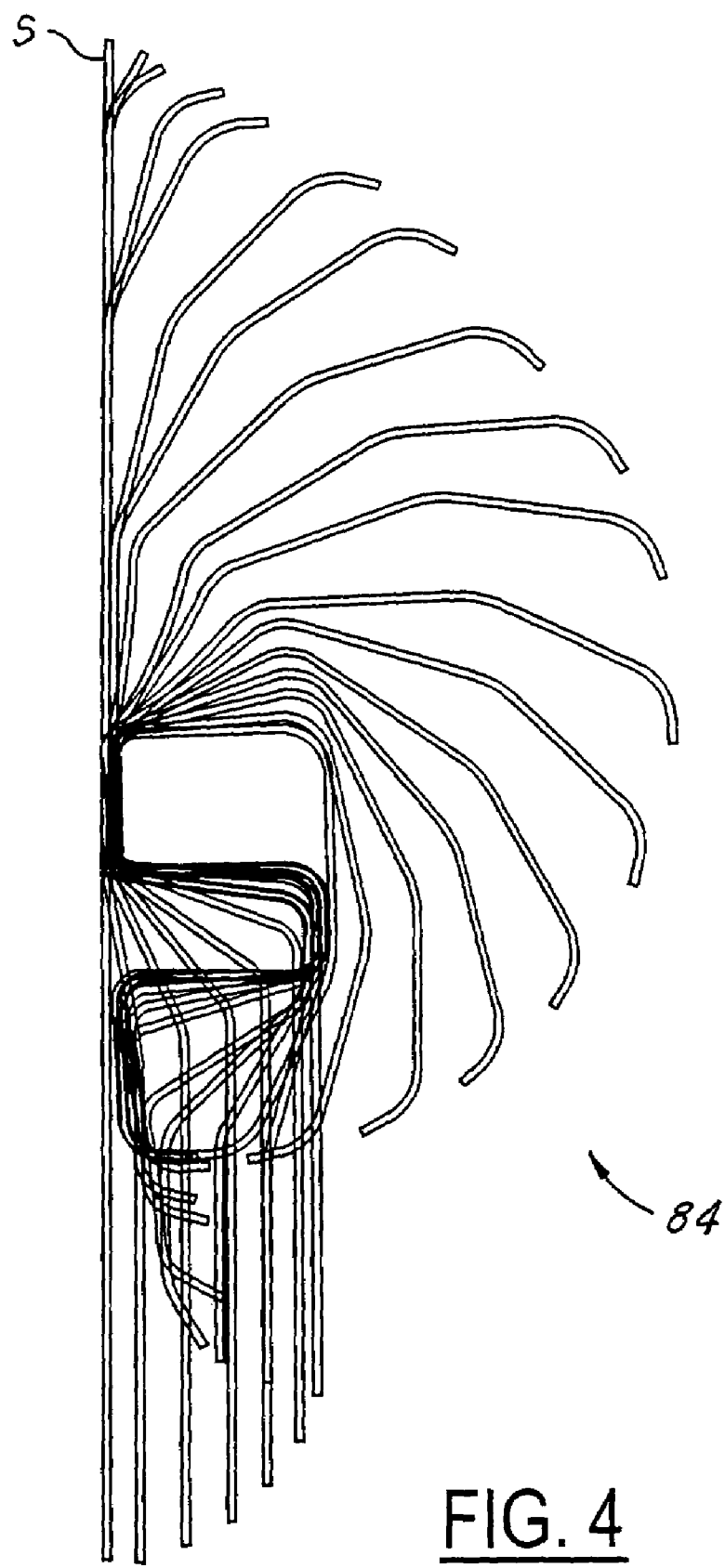
FIG. 4 illustrates a flower pattern of the steel sheet as the rollers of the roll-forming apparatus form the sheet into the "B" section blank.
Figures 4A, 4B, 4C, 4D, 4E:
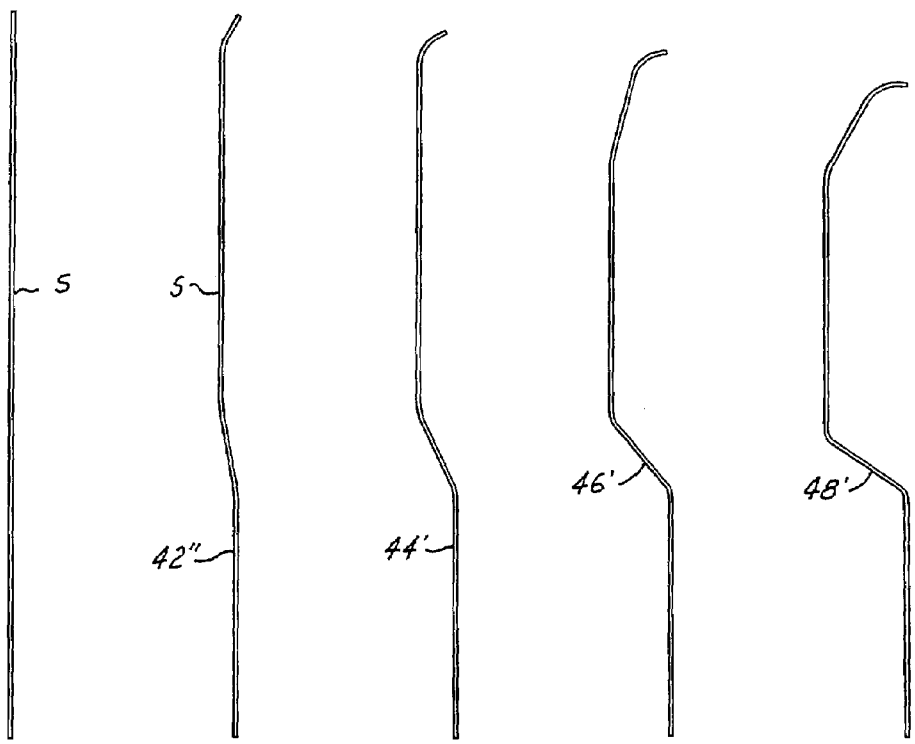
FIGS. 4A–4Q inclusive shows the consecutive steps for progressively forming the flat steel sheet (FIG. 4A) into the "B" section blank of FIG. 4Q.
Figures 4F, 4G, 4H, 4I:
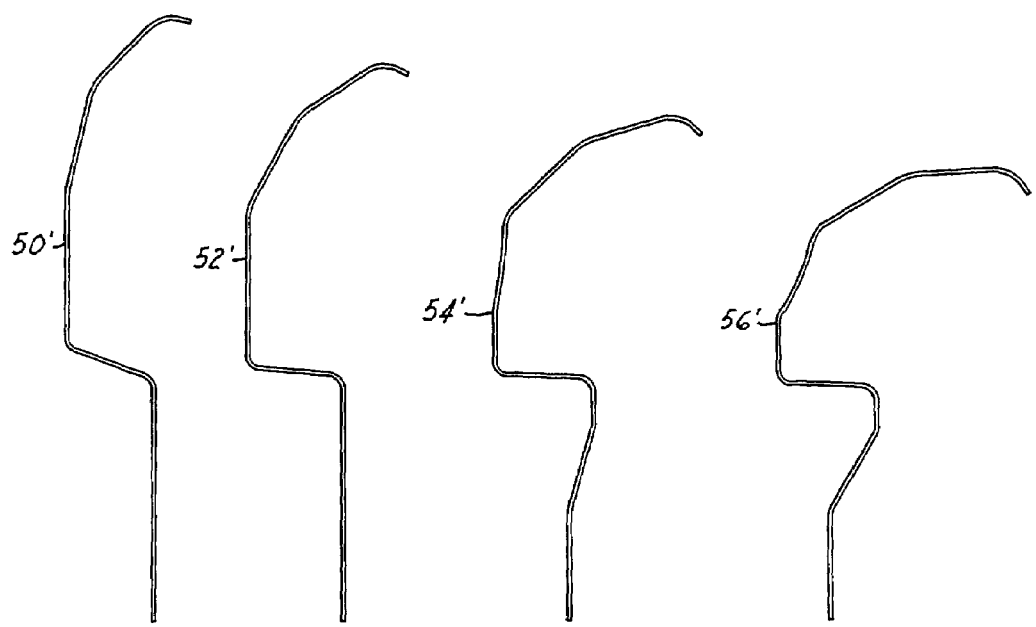
Figure 4J:
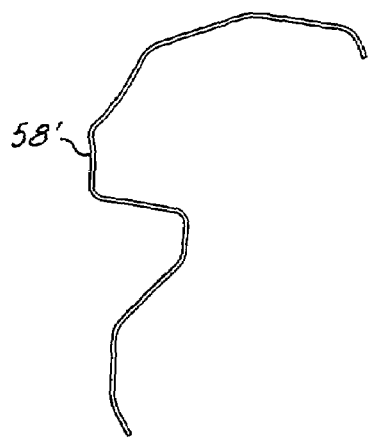
Figure 4K:
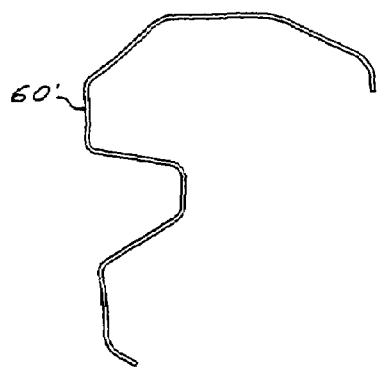
Figure 4L:
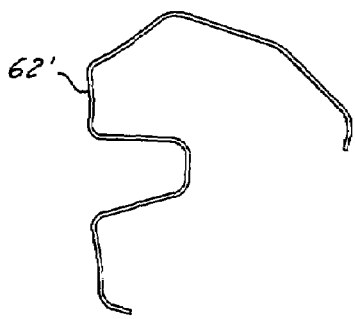
Figure 4M:
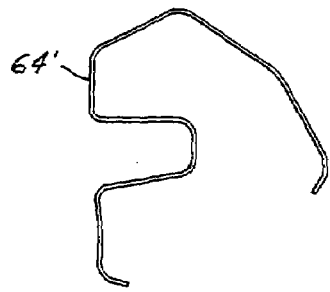
Figure 4N:
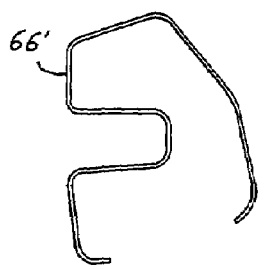
Figure 4O:
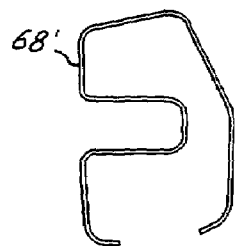
Figure 4P:
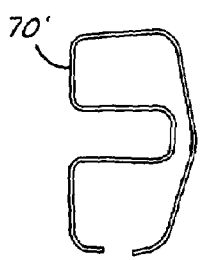
Figure 4Q:
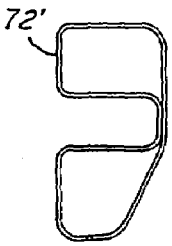

Referring now to FIG. 4 where steel sheet S is illustrated in a flower diagram or pattern folded or bent by the roll formers 42–72 inclusive. Each roll former places a predetermined bend or pattern in the strip S as it proceeds along the line. Thus, FIGS. 4A–4Q illustrate seventeen different patterns, with the straight sheet S being illustrated in FIG. 4A. The first roller or roll former 42 of the roll mill 16 places several bends in sheet S as shown in FIG. 4B. As the strip of steel S continues to proceed downstream of the roll formers, the roll formers continue to progressively bend and shape the metal. Thus each FIGS. 4B–4Q represents roll formers 42–72 inclusive and the metal cross sections designated by the correspondence roll former plus the—'—designation. The last roll former 72 closes the gap between the longitudinal edges as shown in FIG. 4P. After the straight tubular cross member 14 is formed, it proceeds to a two step welding process where the front walls 86 overlie the web 94 and are spot welded thereto along the length of the cross member 14 at longitudinally spaced areas 95. It is followed almost simultaneously by the inline high frequency welding of the longitudinal edges 104 and 106 to form the butt weld 107 throughout the length of the cross member 14. Thus, the edges 104 and 106 have an abutment weld represented by the numeral 107. Generally the abutment weld will be located at the bottom of the bumper 10 as it is mounted on the vehicle 12 although it could be located at the top. The longitudinal edges 104, 106 are butt welded and do not overlap any other portion of the cross member 14.

The gravity stacking system or pallet 82 containing the straight tubular cross members 14 is moved to a remote work station where a curvature or sweep is placed in each cross member 14 to form the bumper 10 of FIG. 1. To place the sweep or curvature in the cross member 14, bender 110 is employed.

Figure 5:
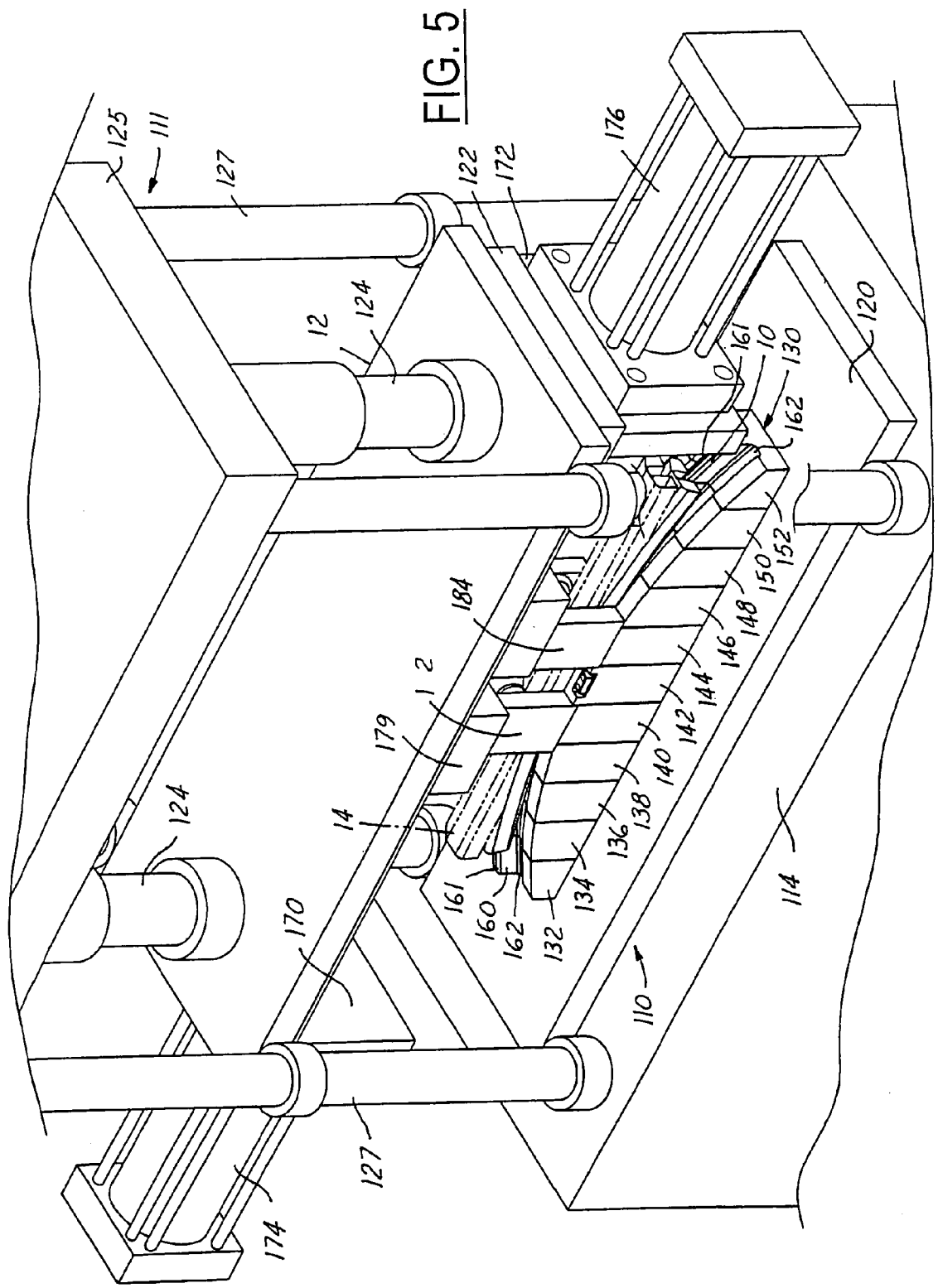
FIG. 5 is a perspective view of the bender or bumper sweep apparatus in a hydraulic press for placing a sweep or a longitudinal curvature in the "B" section blank to form a swept or curve bumper beam.
Figure 6:
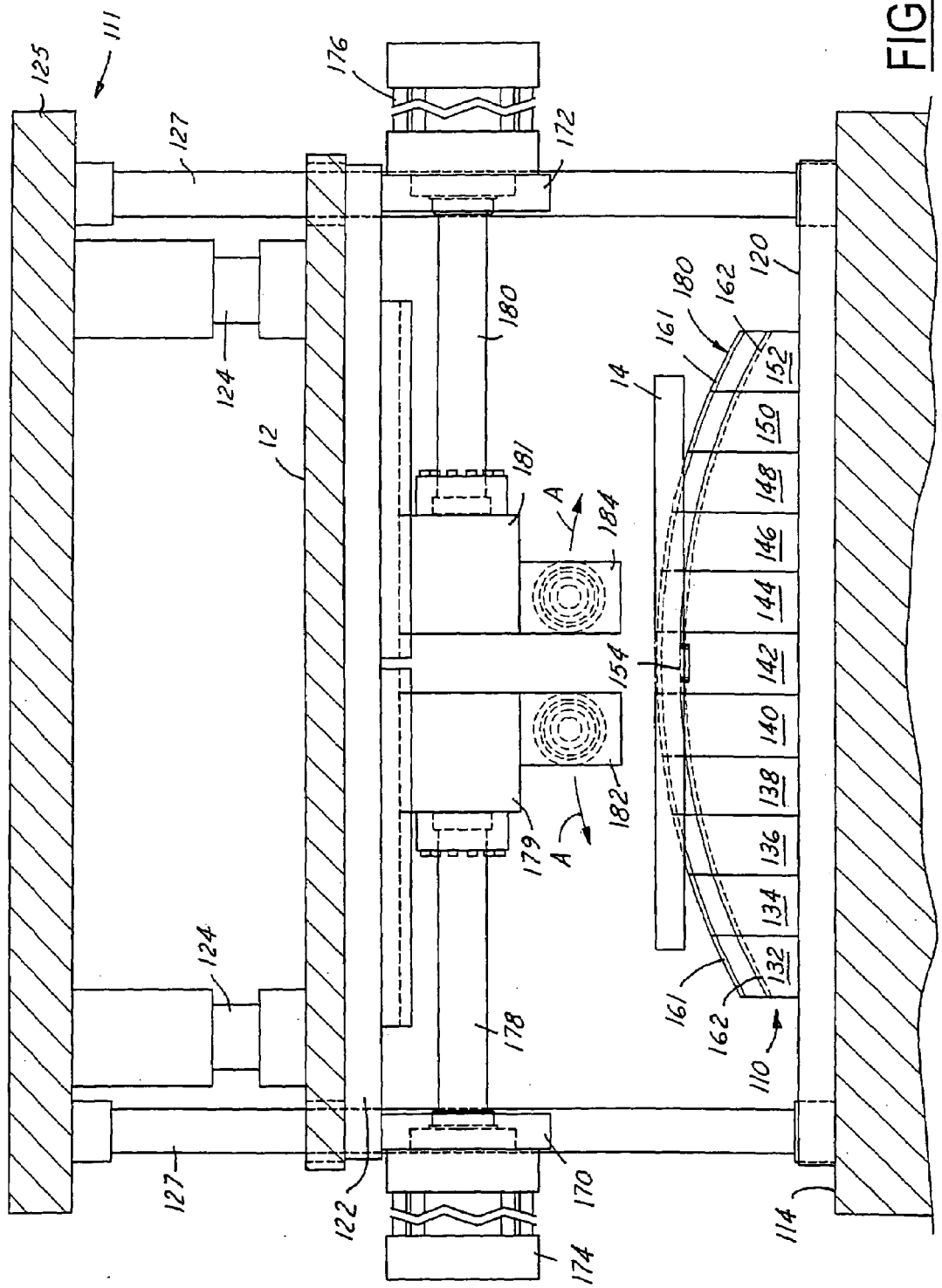
FIG. 6 illustrates the bumper sweep apparatus in the hydraulic press which is in an open position, with a "B" section blank securely mounted at the center on a contour cut male sweep mandrel.

The bender 110, as shown in FIGS. 5 and 6, has a lower base plate 120 and an upper base plate 122. The lower plate 120 is mounted on the base 114, as an example of a conventional 100 ton hydraulic press 111. The upper base plate 122 is secured to the press platen 123 and is movable therewith. The movement of plate 122 and platen 123 is guided by the posts 124 upon actuation of the hydraulic press 111. The press 111 includes an upper support 125 spaced from the base 114 by corner posts 127.

Mounted on the lower plate 120 of bender 110 is a curved contour swept male mandrel 130 having a top surface of arcuate configuration as viewed in FIG. 5. The male mandrel 130 is comprised of eleven segments numbered 132–152 inclusive. The center segment 142 is fixed to the lower plate 120 and forms a pedestal for a clamping mechanism 154 which is hydraulically operated for securing the straight cross member 14 on the male mandrel 130. The clamping mechanism 154 is operated by a pair of hydraulic cylinders, not shown, to open the mechanism 154 to receive a cross member 14 and to close the mechanism 154 to clamp the cross member 14 in place on the curved mandrel 130 as shown in FIGS. 5 and 6. Each section of the male mandrel 130 as viewed from the end of FIG. 5 includes an upstanding center support 160 located between a pair of grooves or channels 162. The B shaped section cross member 14 when mounted on the male mandrel 130 has the center support 160 received in the space between the opposing inner walls 97 of the B shaped cross member 14, with the web 94 opposite the top surface 161 of the support 160. Tubular sections 90 and 92 of the B shaped cross members 14 are received in the channels, grooves or pockets 162 located on the opposite sides of the center support 160.

The upper plate 122 of the bender 110 carries a pair of downwardly extending longitudinally spaced apart plates 170 and 172 for respectively mounting hydraulic cylinders 174 and 176 respectively. The hydraulic cylinders 174, 176 each includes a piston, not shown, and cylinder rods 178 and 180 extending from the cylinders 174 and 176 respectively as shown in FIG. 6. The cylinders 174, 176 are mounted on the same longitudinal axis, with the outer ends of each piston rods 178, 180 mounting support structures 179, 181 to respectively support wiper blocks 182 and 184. Each wiper block 182, 184 has a profile which is cut to the profile of the opposing surface of the front walls 86 of the cross member 14. The wiper blocks 182, 184 are driven outward from the center by the hydraulic cylinders 174 and 176. Hydraulic cylinders 174, 176 are operated in sequence with the hydraulic press 111. With the hydraulic press 111 energized and moving in a downward direction, the wiper blocks 182, 184 engage the top surface of the front walls 86 of the cross member 14 and thereafter the wiper blocks 182, 184 are moved in the "center out" direction, as represented by arrows A as the hydraulic press 111 continues to move downwardly as illustrated in FIG. 6. Thus, a curvature is placed in the cross member 14 to form the bumper 10 as represented by the solid line curved bumper 10 in FIG. 5.

It should be understood that various benders or apparatuses and presses may be used to place a sweep or curvature in the bumper 10.

What is claimed is:

1. An elongated bumper bar for a motor vehicle comprising:
    a single sheet of high tensile strength steel having a pair of longitudinal edges and roll-formed to cause the longitudinal edges to abut one another to provide an integral tubular structure of B-shaped cross section capable of absorbing energy during an impact with an object;
    said tubular structure having first and second, side-by-side, box-like tubular sections connected together by a web, with each tubular section having a front impact wall, an outer side wall, a rear wall and an inner side wall;
    each inner side wall being parallel to and spaced from the other inner side wall and integrally connected to said web;
    each inner side wall extending away from said web in the same direction;
    each of said rear walls being located in a plane parallel to said web being integrally connected to the inner side wall of its tubular section and adapted for connection to the motor vehicle;
    each of said rear walls being integrally connected to the outer side wall of its tubular section;
    the outer side wall of one of the tubular sections being parallel to and substantially wider than the outer side wall of the other tubular section of the bumper bar;
    the outer side wall of said other tubular section having the longitudinal edges of the sheet abutting each other and welded together by high frequency welding throughout their longitudinal extent without any gaps between said edges;
    the front impact wall of said one tubular section being integrally connected to the outer side wall and having a portion thereof overlying and abutting said web;
    the front impact wall of said other tubular section being integrally connected to the outer side wall and having a portion thereof overlying and abutting said web, with the remaining front wall portion inclined on an angle and extending towards and being connected to said outer side wall of said other tubular section; and
    said front wall portions of said tubular sections which overlie and abut said web being tack welded to said web at longitudinally spaced areas to prevent separation of said front impact walls from said web.

2. The elongated bumper bar of claim 1, said one tubular section is the upper section of the bumper bar and said other tubular section is the lower section of the bumper bar, said lower section having its outer side wall with the welded abutting longitudinal edges facing downwardly and generally hidden from view when mounted on the motor vehicle.

* * * * *